(12) United States Patent
Inada et al.

(10) Patent No.: US 8,587,804 B2
(45) Date of Patent: Nov. 19, 2013

(54) PRINTING DEVICE AND CONTROL METHOD FOR A PRINTING DEVICE

(75) Inventors: Hironobu Inada, Matsumoto (JP); Akihiro Ikeda, Toumi (JP); Hiroyuki Sakaguchi, Nagano (JP); Shunichi Wakasa, Chikuma (JP)

(73) Assignee: Seiko Epson Corporation, Tokyo (JP)

( * ) Notice: Subject to any disclaimer, the term of this patent is extended or adjusted under 35 U.S.C. 154(b) by 1040 days.

(21) Appl. No.: 12/324,686

(22) Filed: Nov. 26, 2008

(65) Prior Publication Data

US 2009/0141308 A1 Jun. 4, 2009

(30) Foreign Application Priority Data

Nov. 30, 2007 (JP) ................. 2007-310646
Nov. 30, 2007 (JP) ................. 2007-310647
Nov. 30, 2007 (JP) ................. 2007-310648

(51) Int. Cl.
*G06F 3/12* (2006.01)
*G06F 15/00* (2006.01)
*G06K 1/00* (2006.01)
*G06K 15/00* (2006.01)

(52) U.S. Cl.
USPC .......... 358/1.15; 358/1.18; 358/1.13; 358/1.1

(58) Field of Classification Search
None
See application file for complete search history.

(56) References Cited

U.S. PATENT DOCUMENTS

| 7,710,442 | B2 * | 5/2010 | Lyons et al. ................. 347/171 |
| 2005/0094181 | A1 * | 5/2005 | Koyano .................. 358/1.13 |
| 2007/0146767 | A1 * | 6/2007 | Sakura .................. 358/1.14 |
| 2007/0211099 | A1 * | 9/2007 | Lyons et al. .................... 347/16 |
| 2007/0211132 | A1 * | 9/2007 | Lyons et al. .................. 347/190 |
| 2007/0212146 | A1 * | 9/2007 | Lyons et al. .................... 400/82 |
| 2008/0297583 | A1 * | 12/2008 | Lyons et al. .................. 347/211 |
| 2008/0297584 | A1 * | 12/2008 | Lyons et al. .................. 347/211 |
| 2008/0316534 | A1 * | 12/2008 | McGarry et al. ............. 358/1.18 |
| 2009/0185021 | A9 * | 7/2009 | Lyons et al. .................. 347/190 |
| 2009/0290923 | A9 * | 11/2009 | Lyons et al. .................... 400/82 |

FOREIGN PATENT DOCUMENTS

| EP | 0 953 950 A2 | 11/1999 |
| JP | 03-027434 A | 2/1991 |
| JP | 04-001067 A | 1/1992 |
| JP | 04-302323 A | 10/1992 |
| JP | 11-328534 A | 11/1999 |
| JP | 2000-267826 A | 9/2000 |
| JP | 2000-326581 A | 11/2000 |
| JP | 2002-234215 A | 8/2002 |
| JP | 2002-316453 A | 10/2002 |
| JP | 2003-058950 A | 2/2003 |
| JP | 2007-021853 A | 2/2007 |
| JP | 2009-123028 A | 6/2009 |
| WO | WO 2008/156466 A1 | 12/2008 |

* cited by examiner

*Primary Examiner* — King Poon
*Assistant Examiner* — Vincent Peren
(74) *Attorney, Agent, or Firm* — Kilpatrick Townsend & Stockton LLP

(57) ABSTRACT

An electronic method for printing is disclosed, the method including receiving print data from a host computer, the print data including an indicator, wherein the print data does not include supplemental duplex or simplex printing settings, determining that the indicator is within the print data, analyzing the indicator to determine duplex or simplex printing, writing a first portion of the print data to a memory unit, writing a second portion of the print data to the memory unit, printing a first side of a paper according to the first portion of the print data, and printing a second side of the paper according to the second portion of the print data.

22 Claims, 16 Drawing Sheets

PRINTING DEVICE AND CONTROL METHOD FOR A PRINTING DEVICE

CROSS-REFERENCES TO RELATED APPLICATIONS

This application claims priority to Japanese Patent Application No. 2007-310646, filed Nov. 30, 2007, Japanese Patent Application No. 2007-310647, filed Nov. 30, 2007, and Japanese Patent Application No. 2007-310648, filed Nov. 30, 2007, the disclosures of which are each incorporated by reference herein.

BACKGROUND

1. Field of the Invention

The present invention relates to a printing device enabling both simplex printing and duplex printing on a print medium, and to a control method for the printing device.

2. Description of Related Art

Printing devices (simply "printers" below) that can print on both sides of paper or other print medium (commonly called "duplex printing") are taught in Japanese Unexamined Patent Appl. Pub. JP-A-03-027434 and Japanese Unexamined Patent Appl. Pub. JP-A-04-001067.

Japanese Unexamined Patent Appl. Pub. JP-A-03-027434 and Japanese Unexamined Patent Appl. Pub. JP-A-04-001067 teach a printing system that has a repagination unit, an odd-page processing unit, an even-page processing unit, and a reverse-side print processing unit. The repagination unit repaginates and updates the page numbers when a duplex printing command is issued by the host computer. The odd/even page determination unit determines whether a page number is odd or even. If the page number is odd, the odd-page processing unit prints on the front of a sheet and then discharges the sheet into an intermediate holding tray. If the page number is even, the even-page processing unit writes the start address and length of the even page print command string to a control table. The reverse-side print processing unit prints the even pages on the second side of the sheets on which the odd pages have been printed on the first side and are stored in the holding tray.

The host computer issues a duplex printing command to the printing system in order to print on both sides. If the storage capacity of the holding tray is exceeded or the end of the document is detected during the first-side printing process, operation switches from the first-side printing process to the second-side printing process. More specifically, a command must be asserted by the host computer to switch from single-sided printing (known as "simplex printing") to duplex printing.

Printers that switch between duplex printing and simplex printing according to the on or off state of a DIP switch are also known from the literature.

In order to switch printing from simplex printing to duplex printing or from duplex printing to simplex printing with the methods described above, the user must change the setting before each printing process starts.

When printing sales receipts on continuous paper, for example, the length of each receipt differs with each transaction. The issued receipt is long when a large number of products are purchased, and is short when few products are purchased. The method of the related art requires the operator to change the setting each time printing switches between duplex printing and simplex printing, and this is annoying. It is also particularly a problem when printing receipts, an operation which typically requires quick processing.

Furthermore, because the print data differs in each receipt printing process (each print job), the balance between the results of printing on front and back changes according to the location of the break between the first-side data and the second-side data in the print data contained in each print job.

Yet further, when the details of the purchased products are printed on the front and coupons are printed on the back, printing on the back may start from the middle of a printed image unless a break is inserted between the text data and the image data. If printing the back starts in the middle of the image data, receipts that have a positive visual impact on the customer cannot be issued. It is therefore desirable to be able to freely insert a break between the first-side data and the second-side data in each print job.

In order to print receipts that have a greater visual impact on the customer, receipts are not often printed with text data combined with a logo, and it is often desirable to insert logos in duplex printing jobs. Inserting a logo enables the merchant to appeal to the user, and produces receipts that are easier to read.

SUMMARY OF THE INVENTION

A printing device and control method for a printing device according to the present invention enable a printer that is capable of simplex printing and duplex printing to switch between simplex printing and duplex printing based on the print data without requiring the user to first set the printing method before executing the printing process.

A printing device and control method for a printing device according to another aspect of the invention enable producing easier to read output even when a logo, for example, is inserted in a duplex printing job.

Another object of the invention is to distribute the print data more evenly on the front and back sides when the length of the print data differs with each print job.

A printing device and control method for a printing device according to another aspect of the invention enable freely changing the distribution of data to the front and back sides in each print job during duplex printing to achieve more desirable results.

A first aspect of the invention is a printing device that prints in a simplex printing mode or duplex printing mode to a print medium, and includes a reception unit that receives a specified text string used as a break point for separating print data into first-side data and second-side data, or setting data for setting said break point; an evaluation unit that determines if the setting data satisfies a predetermined condition when the setting data is received; and a printing unit that executes duplex printing when the specified text string is received or the predetermined condition is satisfied, and executes simplex printing when the specified text string is not received or the predetermined condition is not satisfied.

Another aspect of the invention is a control method for a printing device that prints in a simplex printing mode or duplex printing mode to a print medium, the control method including a reception step that receives a specified text string used as a break point for separating print data into first-side data and second-side data, or setting data for setting said break point; an evaluation step that determines if the setting data satisfies a predetermined condition when the setting data is received; and a printing step that executes duplex printing when the specified text string is received or the predetermined condition is satisfied, and executes simplex printing when the specified text string is not received or the predetermined condition is not satisfied.

A printing device that can operate in a simplex printing mode and a duplex printing mode according to this aspect of the invention switches between duplex printing and simplex printing based on whether or not a specified text string is received or set data meet a predetermined condition. It is therefore possible to freely select the printing method without setting the printing method before the printing process executes by simply controlling the presence of the specified text string in the print data or changing the predetermined condition.

The printing device according to another aspect of the invention also has a specified text string setting unit that sets the specified text string according to a specified text string setting command from a host computer, and a specified text string evaluation unit that interprets print data sent from the host computer and determines if data matching the specified text string is contained in the print data when the specified text string is set in the printing device, and the printing unit executes duplex printing when the specified text string evaluation unit determines that data matching the specified text string is contained, and executes simplex printing when the specified text string evaluation unit determines that data matching the specified text string is not contained.

The printing device control method according to another aspect of the invention also has a step that interprets print data sent from the host computer and determines if data matching the specified text string is contained in the print data when the specified text string is previously set in the printing device, and the printing step executes duplex printing when data matching the specified text string is contained, and executes simplex printing when data matching the specified text string is not contained.

This aspect of the invention sets the specified text string according to a specified text string setting command, executes duplex printing when the specified text string is set and data matching the specified text string is contained in the print data sent from the host computer. If data matching the specified text string is not contained, it operates in the simplex printing mode. Therefore, even if the printing method is not set before the printing process is executed, duplex printing is executed if the print data contains the specified text string, simplex printing is executed if the print data does not contain the specified text string, and operation can be freely switched between duplex printing and simplex printing according to the content of the print data.

A printing device according to according to another aspect of the invention also has a first data storage area for storing the first-side data of the print data, a second data storage area for storing the second-side data of the print data, and a print data conversion unit that writes the print data to the first data storage area until the specified text string evaluation unit determines that data matching the specified text string is contained, and writes the print data following the specified text string to the second data storage area. The printing unit simultaneously prints the converted first-side data and second-side data in the duplex printing mode according to a start printing command.

The control method according to according to another aspect of the invention also has a first data conversion step that writes the print data to a first data storage area until it is determined that data matching the specified text string is contained, and a second data conversion step that writes the print data following the specified text string to a second data storage area. The printing step simultaneously prints the converted first-side data and second-side data in the duplex printing mode according to a start printing command.

This aspect of the invention writes the print data to a first data storage area until it is determined that data matching the specified text string is contained in the print data, and after it is determined that data matching the specified text string is contained in the print data, writes the print data following the specified text string to a second data storage area. After the print data is written to the second storage area, the print data written to the first storage area and the second storage area is printed simultaneously to the opposite sides of the print medium according to a start printing command. Therefore, because both sides of the print medium are printed simultaneously, printing can be completed in less time than when the second side of the printout is printed after printing the first side, and less print media is consumed.

A printing device according to according to another aspect of the invention also has a cutting unit that cuts continuous paper in response to a cutting command for cutting continuous paper used as the print medium, and when the specified text string evaluation unit cannot determine that data matching the specified text string is contained before a cutting command that is also the start printing command is received, the printing unit executes the simplex printing mode based on the first-side data written to the first data storage area.

A control method for a printing device according to yet another aspect of the invention also has a cutting step of cutting continuous paper in response to a cutting command for cutting continuous paper used as the print medium, and when it cannot be determined that data matching the specified text string is contained before a cutting command that is also the start printing command is received, the printing step executes the simplex printing mode based on the first-side data written to the first data storage area.

If the specified text string cannot be received before the cutting command is received in this aspect of the invention, the print data is written to the first data storage area and the printing process is executed without writing data to the second data storage area. More specifically, operation proceeds in the simplex printing mode based on the first-side data written to the first data storage area when the paper cutting command is received. Simplex printing is therefore possible without setting the printing method to simplex printing before the printing process executes.

In a printing device according to according to another aspect of the invention a plurality of different specified text strings can be set by the specified text string setting command sent from the host computer.

This aspect of the invention provides greater freedom setting the specified text string, and enables setting the specified text string according to the user's particular need.

In a printing device according to according to another aspect of the invention the specified text strings can be deleted individually or in batches.

Because a plurality of different specified text strings can be deleted individually or in batches in this aspect of the invention, it is possible to change only some of the specified text strings when the use or application of the printing device changes, or to batch delete set specified text strings that have become unnecessary.

When the specified text string setting unit has not set the specified text string in a printing device according to according to another aspect of the invention, the printing unit repeatedly executes the print data conversion process and printing process without waiting to receive the cutting command, and prints on one side of the continuous paper.

When the specified text string is not set, the printing step in the control method of a printing device according to according to another aspect of the invention repeatedly executes the print data conversion process and printing process without waiting to receive the cutting command, and prints on one side of the continuous paper.

When the specified text string setting unit has not set the specified text string in this aspect of the invention, simplex printing is executed based on the print data received before a cutting command is received. As a result, the printing device of the invention can operate in the simplex printing mode without waiting for a cutting command if the specified text string is not set. If the specified text string is set but the specified text string is not contained in the print data, the print data continues to be written to the first data storage area until the cutting command is received, and the simplex printing mode executes when the paper cutting command is received. This enables executing simplex printing in two different ways.

For example, if the user wants to use only the simplex printing function, high speed printing is possible without being concerned about the time until the content is printed if the method (simplex printing mode) that prints while converting the print data without setting the specified text string is used.

However, if the user wants to adaptively use both the simplex printing function and duplex printing function, operation can be easily switched between simplex printing and duplex printing based on whether the specified text string is present if the method (simplex printing in the duplex printing-compatible mode) in which the specified text string is set and the printing process executes according to the cutting command after the print data conversion process ends is used.

In a printing device according to according to another aspect of the invention, the setting data is a command sent from the host computer and is an image data print command for printing image data defined in an image storage unit of the printing device, the predetermined condition is whether the image data print command can be executed, the evaluation unit determines if the image data print command can be executed, and the printing unit executes duplex printing including the image data when the evaluation unit determines that the image data print command can be executed, and executes simplex printing when the evaluation unit determines the image data print command cannot be executed or the image data print command is not received.

In a control method for a printing device according to according to another aspect of the invention the setting data is a command sent from the host computer and is an image data print command for printing image data defined in an image storage unit of the printing device, the predetermined condition is whether the image data print command can be executed, the evaluation step determines if the image data print command can be executed, and the printing step executes duplex printing including the image data when it is determined that the image data print command can be executed, and executes simplex printing when it is determined that the image data print command cannot be executed or the image data print command is not received.

When the image data print command sent from the host computer can be executed in this aspect of the invention, duplex printing including the image data is executed, and if the image data print command cannot be executed, simplex printing is executed. It is therefore possible to switch freely between duplex printing and simplex printing according to whether or not an image data print command can be executed without setting the printing method before the printing process executes. Furthermore, because images can be inserted in duplex printing according to the image data print command, a more visually appealing printout can be achieved. Yet further, consumption of the continuous paper can be reduced by using duplex printing, and the continuous paper can be replaced less frequently.

A printing device according to according to another aspect of the invention also has a first data storage area to which the first-side data of the printout is written from the print data received from the host computer, a second data storage area to which the second-side data of the printout is written from the print data, and a print data conversion unit that writes the print data to the first data storage area until the evaluation unit determines that the image data print command can be executed, and writes the print data to the second data storage area after the evaluation unit determines that the image data print command can be executed, and the printing unit simultaneously executes duplex printing including the image data in either the first-side data or the second-side data in response to a start printing command.

A control method for a printing device according to according to another aspect of the invention also has a print data conversion step of writing the print data to the first data storage area in which the first-side data of the printout is converted until the evaluation step determines that the image data print command can be executed, and writes the print data to the second data storage area in which the second-side data of the printout is converted after the evaluation step determines that the image data print command can be executed, and the printing step then simultaneously executes duplex printing including the image data in either the first-side data or the second-side data in response to a start printing command.

This aspect of the invention enables switching freely between duplex printing and simplex printing according to whether an image data print command can be executed without setting the printing method before the printing process executes. Particularly because both sides of the print medium are printed simultaneously during duplex printing, printing can be completed in less time than when the second side of the printout is printed after printing the first side is finished, and power consumption can be reduced.

A printing device according to according to another aspect of the invention also has a cutting unit that cuts continuous paper in response to a cutting command for cutting continuous paper used as the print medium, and the start printing command is the cutting command.

This aspect of the invention does not need to assert both a start printing command and a paper cutting command, and can thus reduce power consumed inputting commands, because both printing and paper cutting are controlled with the start printing command.

In a printing device according to according to another aspect of the invention the setting data is a break point setting command for setting a break point where the print data is divided into first-side data and second-side data. The printing device also has a data conversion unit for interpreting the print data and storing the result as converted print data in the data storage area, and a break point setting unit for setting a break point in the converted print data according to the break point setting command. The predetermined condition is whether or not a break point that can divide the converted print data is set. The printing unit functions as the evaluation unit, divides the converted print data into first-side data and second-side data based on the break point and executes duplex printing according to the start printing command when it determines that a break point enabling dividing the print data is set by the break point setting command, and executes simplex printing when it determines that a break point that cannot divide the print data is set.

In the printing device control method according to according to another aspect of the invention the setting data is a break point setting command for setting a break point where the print data is divided into first-side data and second-side data. The control method also includes a step of interpreting the print data and storing the result as converted print data in the data storage area, and a step of setting a break point in the converted print data according to the break point setting command. The predetermined condition is whether or not a break point that can divide the converted paper feed is set. The evaluation step determines if a break point enabling division is set, and the printing step divides the converted print data into first-side data and second-side data based on the break point and executes duplex printing according to the start printing command when it is determined that a break point enabling division is set by the break point setting command, and executes simplex printing when it is determined that a break point that cannot divide the print data is set.

The break point in the converted print data is set by the break point setting command in this aspect of the invention. Because the break point can be set freely according to the print data, the first-side data and second-side data can be distributed freely on the printout to produce a more visually pleasing duplex printing result according to the break point setting even when the first-side print data and second-side print data are different lengths.

When the break point is not set by the break point setting command in a printing device according to another aspect of the invention, the printing unit executes duplex printing using the position dividing the converted print data in half as the break point.

Because a position dividing the converted print data in half is recognized as the break point when the break point is not set in this aspect of the invention, the print data can be evenly distributed to the first and second sides of the printout.

In a printing device according to another aspect of the invention, the data conversion unit measures a dot count of the converted print data, and the break point is a number of dots in the longitudinal direction of the converted print data when the transportation direction of the printout is the longitudinal direction.

The control method for a printing device according to another aspect of the invention measures a dot count of the converted print data in the data conversion step, and sets the break point to a number of dots in the longitudinal direction of the converted print data when the transportation direction of the printout is the longitudinal direction.

This aspect of the invention measures the number of dots while writing the print data to the data storage area. As a result, when the break point is not set, the break point can be set to half the number of counted dots (measured dot count/2).

A printing device according to another aspect of the invention also preferably has a cutting unit that cuts the printout based on a cutting command for cutting the printout, and the printing unit simultaneously prints both sides according to the cutting command used as the start printing command.

In the control method for a printing device according to another aspect of the invention, the printing step simultaneously prints both sides according to the print medium cutting command that is also used as the start printing command, and after the printing step cuts the printed medium based on the cutting command after the printing process.

Because this aspect of the invention prints simultaneously to both sides of the print medium, printing can be completed in less time than when the second side of the print medium is printed after the first side is printed, and power consumption can be reduced. Consumption of paper can also be reduced by printing on both sides of the continuous paper, and the continuous paper can therefore be replaced less frequently. In addition, because the start printing command effects both printing and cutting the print medium, it is not necessary to assert both a start printing command and a cutting command, and the commands can be input with less effort.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Preferred embodiments of the present invention are described below with reference to the accompanying figures.

First Embodiment

Figure 1:
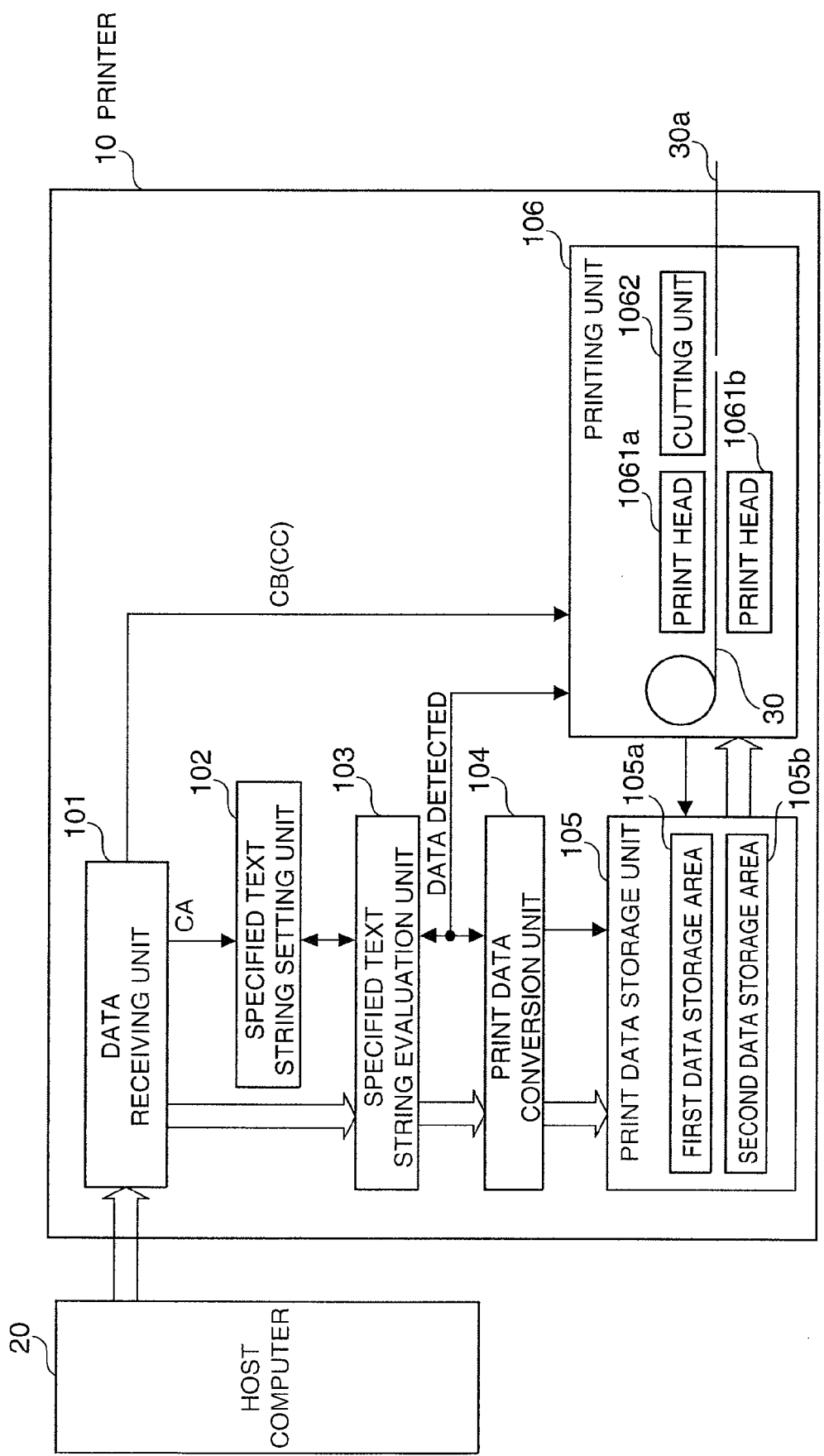
FIG. 1 is a schematic block diagram of a printing device according to a first embodiment of the invention.

FIG. 1 is a schematic block diagram of a printing device according to a first embodiment of the invention. As shown in FIG. 1, a printer 10 according to this embodiment of the invention is a line thermal printer that prints on one side or both sides of a printing medium (such as roll paper or other type of continuous media) according to print commands from a host computer 20.

The printer 10 according to this embodiment of the invention has a data reception unit 101, a specified text string setting unit 102, a specified text string evaluation unit 103, a print data conversion unit 104, a print data storage unit 105, and a printing unit 106.

The data reception unit 101 receives and passes print data sent from the host computer 20 to the specified text string evaluation unit 103. The data reception unit 101 also interprets the received print data, and if a specified text string setting command CA (a text string set by the specified text string setting function) is detected, inputs the detected command CA to the specified text string setting unit 102.

If a start printing command CB (paper cutting trigger) is also detected as a result of interpreting the print data when the specified text string is detected, the command CB is also input to the printing unit 106.

When the specified text string setting command CA is input from the data reception unit 101, the specified text string setting unit 102 sets the specified text string as instructed. An example of the specified text string is "----------------"LF (line feed) command. If the specified text string is set by the specified text string setting unit 102, the specified text string evaluation unit 103 analyzes the print data sent from the host computer 20 and determines if data matching the specified text string is in the print data. If data matching the specified text string is found in the print data, the print data conversion unit 104 so informs the printing unit 106.

The print data conversion unit 104 writes the print data to a first data storage area 105a in the print data storage unit 105 until the specified text string evaluation unit 103 determines that data matching the specified text string is contained in the print data. When the specified text string evaluation unit 103 finds data matching the specified text string in the print data, the print data conversion unit 104 writes the print data following the specified text string to a second data storage area 105b in the print data storage unit 105. The print data conversion unit 104 thus writes the print data to the first data storage area 105a until data matching the specified text string is sent from the host computer 20, and when the data matching the specified text string is received, writes the print data following the specified text string to the second data storage area 105b.

As described above, the print data storage unit 105 has a first data storage area 105a and a second data storage area 105b. This embodiment of the invention writes the first-side data, which is the data to be printed on the front of the continuous paper 30 (referred to below as roll paper) used as the recording medium, contained in the received print data to the first data storage area 105a of the print data storage unit 105, and writes the second-side data, which is the data to be printed on the back of the roll paper 30, contained in the received print data to the second data storage area 105b of the print data storage unit 105. RAM or other type of volatile memory is used as the print data storage unit 105 in this embodiment of the invention.

The printing unit 106 prints on one side or both sides of the roll paper 30 according to the start printing command CB from the host computer 20. The printing unit 106 includes two print heads 1061a and 1061b disposed in opposition with the roll paper 30 therebetween, and a cutting unit 1062 for cutting the roll paper 30. Of these two print heads 1061a and 1061b, the printing unit 106 uses one print head 1061a to print on the first side of the roll paper 30 based on the data stored in the first data storage area 105a, and uses the other print head 1061b to print on the second side of the roll paper 30 based on the data stored in the second data storage area 105b.

The print heads 1061a and 1061b are line thermal print heads, and the roll paper 30 is fed the distance equal to one line each time the print head prints one line. The operations of printing one line and advancing the paper one line are repeated to continuously print both sides of the roll paper 30 simultaneously.

When simplex printing is selected, either one of the print heads 1061a and 1061b is driven to print on one side of the paper.

Note that thermal paper is used as the roll paper 30 in this embodiment of the invention. The roll paper 30 is a paper web that is wound into a cylindrical roll, and is used loaded into the printing unit 106.

In this embodiment of the invention the start printing command CB is a cutting command CC for cutting the roll paper 30. If the specified text string evaluation unit 103 determines that data matching the specified text string is contained in the print data and the printing unit 106 then receives the cutting command CC, the printing unit 106 simultaneously prints the first-side data in the first data storage area 105a and the second-side data in the second data storage area 105b on opposite sides of the paper.

If the specified text string evaluation unit 103 is unable to determine that data matching the specified text string is contained in the print data before the cutting command CC that functions as the start printing command is received, the printing unit 106 prints on one side of the paper based on the first-side data stored in the first data storage area 105a.

After simplex printing or duplex printing, the printing unit 106 then controls the cutting unit 1062 to cut the roll paper 30.

If the specified text string is not set in the specified text string setting unit 102, at least two lines of data are stored in the print data storage unit 105, and a printing process trigger is detected, the printing unit 106 prints and repeats the data conversion process and printing process. More specifically, the printing unit 106 repeatedly executes a printing process for printing one line of the print head 1061a or 1061b, and a paper feed process for advancing the roll paper 30 one line.

The operation of the printer 10 according to this embodiment of the invention is described next.

When the specified text string setting command CA is sent from the host computer 20, the specified text string setting unit 102 in this embodiment of the invention sets the specified text string according to the command. Note that the specified text string may be preset at the factory before the printer 10 ships, or it may be set later by the user. The printing process is executed in the duplex printing mode when the specified text string is set, and is executed in the simplex printing mode when the specified text string is not set, in the following description.

Printing Process in the Simplex Printing Mode

Figure 2:
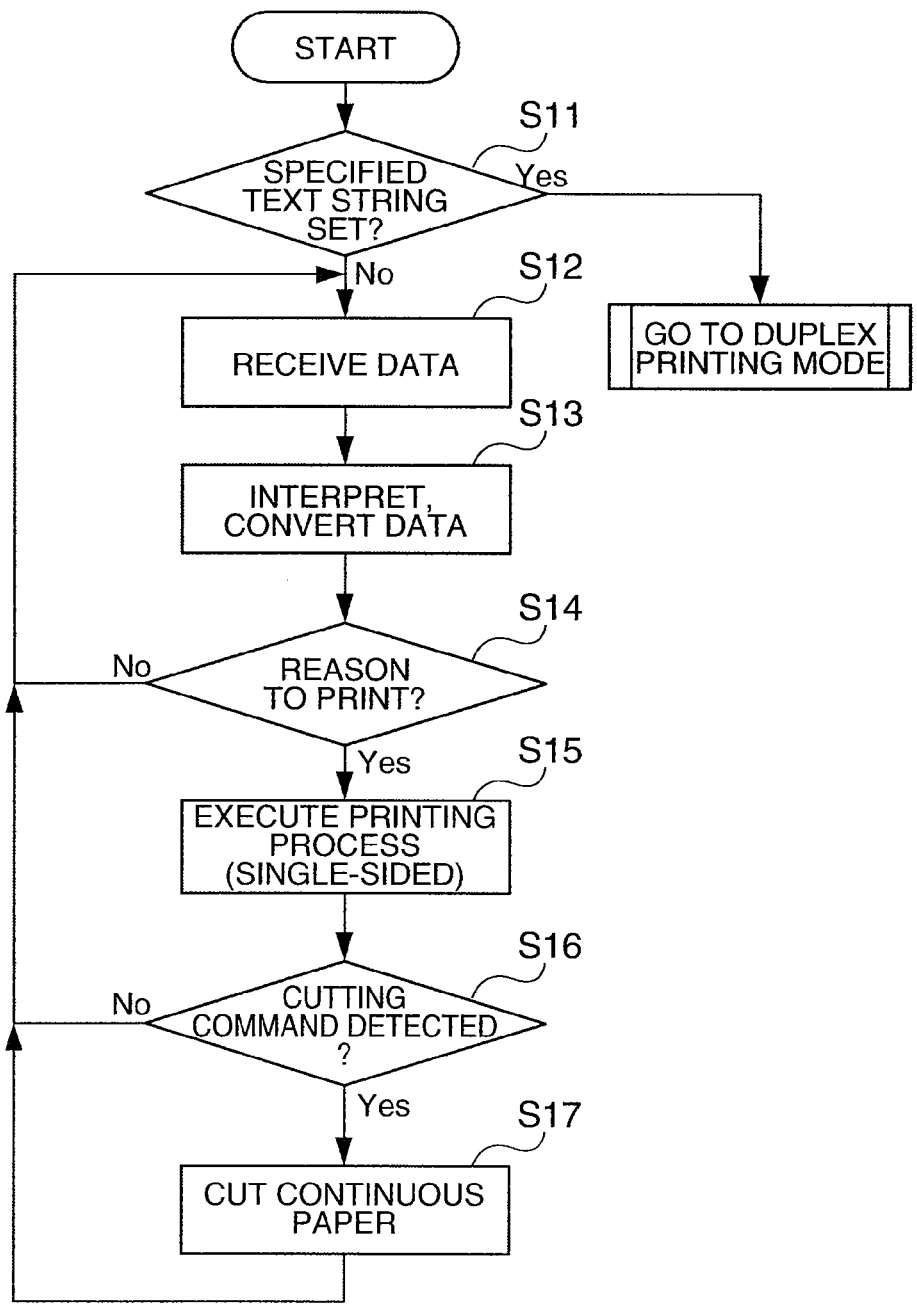
FIG. 2 is a flow chart describing the printing process when the specified text string is not set in the printing device shown in FIG. 1.

FIG. 2 is a flow chart describing the printing process in the simplex printing mode, that is, when the specified text string is not set.

The specified text string evaluation unit 103 first determines if the specified text string is set in the specified text string setting unit 102 (step S11). If the specified text string is set, operation goes to the duplex printing mode described below. If the specified text string is not set (step S11 returns No), operation goes to the simplex printing mode. When operation goes to the simplex printing mode and the print data is received from the host computer 20 (step S12), the data is interpreted and the received print data is written to the first data storage area 105a of the print data storage unit 105 (step S13).

When writing data to the first data storage area 105a starts, operation loops back to step S12 and receiving print data continues until a trigger for executing the printing process is detected (step S14 returns No). If a trigger for executing the printing process is detected (step S14 returns Yes), a printing process for printing one line of the print head 1061 to the roll paper 30 executes, and the roll paper 30 is then advanced the distance equal to one line (step S15).

The trigger for executing the printing process may be a carriage return command, a full buffer, or a roll paper 30 cutting command, for example. If the trigger is a carriage return command, one line of print data stored in the first data storage area 105a is printed until the carriage return command is executed. If the trigger is a full buffer, one line of print data stored in the first data storage area 105a is printed before two lines of print data are written to the first data storage area 105a and the buffer becomes full. If the trigger is a paper cutting command, one line of print data stored in the first data storage area 105a is printed before the cutting command is executed.

When a paper cutting command is detected (step S16 returns Yes), the printed roll paper 30 is advanced to the cutting position and is then cut at the cutting position. Because the paper is not cut when a carriage return is executed or the buffer is full, control returns to step S12 to continue receiving and interpreting the received data and executing the printing and paper feed process until the paper cutting command is received. Data is thus printed when a cause for executing the printing process is detected, and the roll paper 30 is cut when a cutting command is received (step S17).

Figure 4:
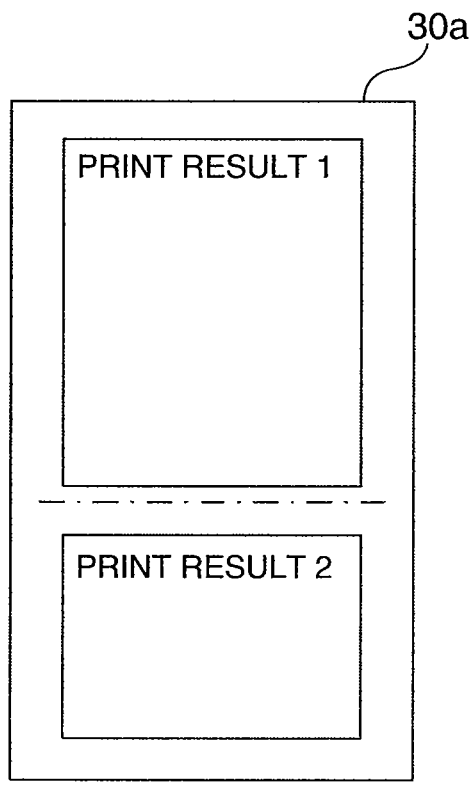
FIG. 4 schematically describes an example of the result of simplex printing when the specified text string is not set in the printing device shown in FIG. 1.

FIG. 4 shows an example of the printout resulting from the flow chart in FIG. 2. Because this is an example of single-sided printing, print result 1, the character string "----------------" LF, and print result 2 are printed on the front of the printout 30a cut off the roll paper 30.

Printing Process in the Duplex Printing Mode

Figure 3:
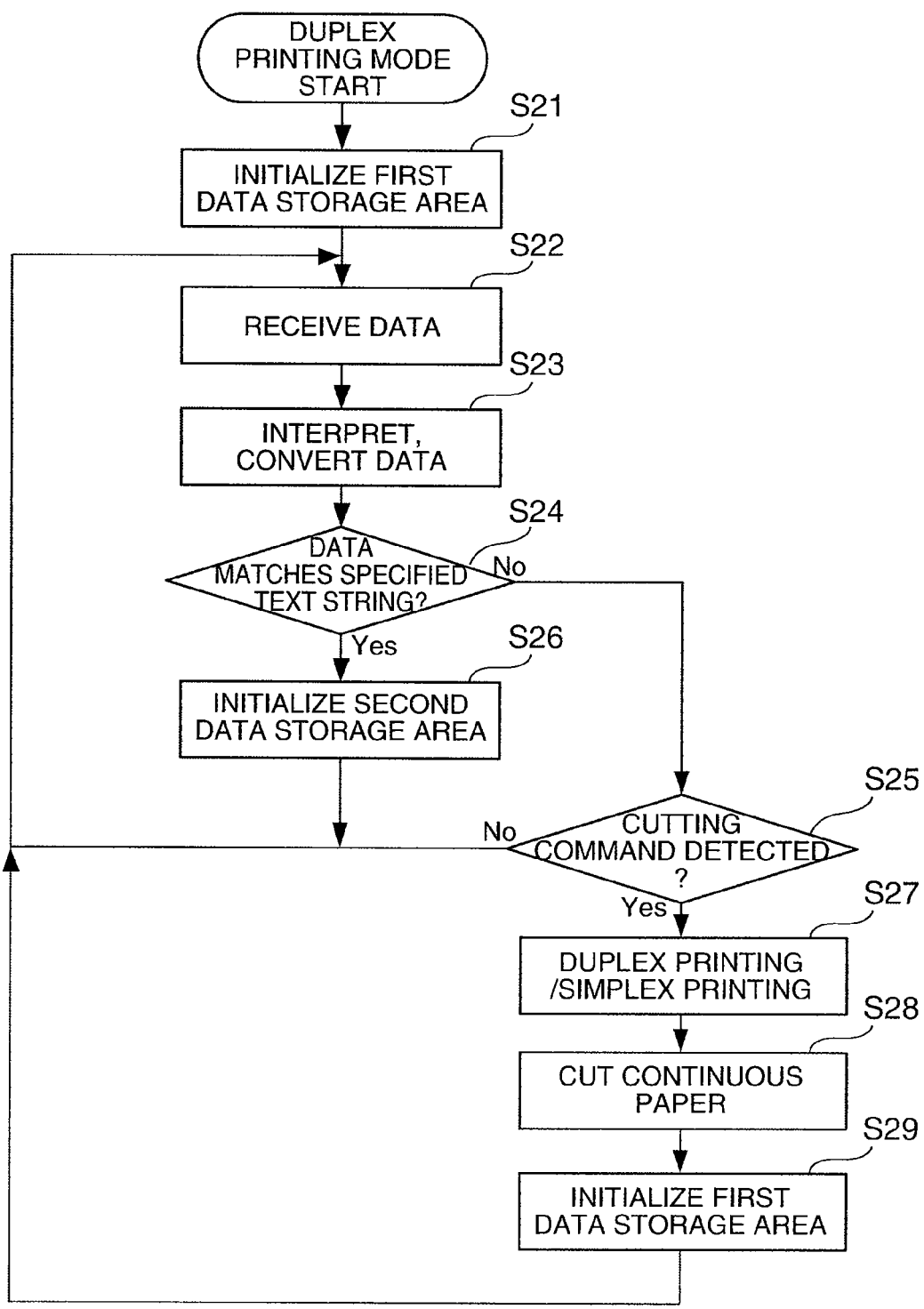
FIG. 3 is a flow chart describing the duplex printing process when the specified text string is set in the printing device shown in FIG. 1.

In this embodiment of the invention operation goes to the duplex printing mode when the specified text string setting command CA is sent from the host computer 20 and the specified text string "----------------" LF is set in the specified text string setting unit 102. FIG. 3 is a flow chart of the duplex printing mode, that is, the duplex printing process when the specified text string is set.

The first data storage area 105a of the print data storage unit 105 is initialized (step S21), the print data sent from the host computer 20 is received (step S22), and the received data is interpreted and written to the first data storage area 105a of the print data storage unit 105 (step S23).

While writing the print data to the first data storage area 105a, whether the received print data matches the specified text string is determined (step S24), and if the received print data does not match (step S24 returns No), whether a cutting command was received is determined (step S25). If a cutting command was not received (step S25 returns No), control returns to step S22, and receiving and converting the print data continues. Step S22, step S23, step S24, and step S25 repeat until data matching the specified text string is received. When data matching the specified text string is received (step S24 returns Yes), the second data storage area 105b of the print data storage unit 105 is initialized (step S26), control returns to step S22, and receiving data continues.

When data matching the specified text string is received, the print data following thereafter is written to the second data storage area 105b. More specifically, the received data is written to the first data storage area 105a of the print data storage unit 105 until the specified text string is received, and after the specified text string is received the data following the specified text string is written to the second data storage area 105b. Writing the print data to the second data storage area 105b continues until the cutting command CC is received.

When the cutting command CC is received, data is printed simultaneously to the front and back sides of the roll paper 30 (step S27). More specifically, the first-side data stored in the first data storage area 105a of the print data storage unit 105 is printed to the front of the roll paper 30, and the second-side data stored in the second data storage area 105b of the print data storage unit 105 is printed on the back side of the roll paper 30. After printing both sides, the roll paper 30 is cut (step S28). After cutting the roll paper 30, the first data storage area 105a of the print data storage unit 105 is initialized (step S29), control returns to step S22, and processing the print data sent from the host computer 20 continues.

Figure 5A:
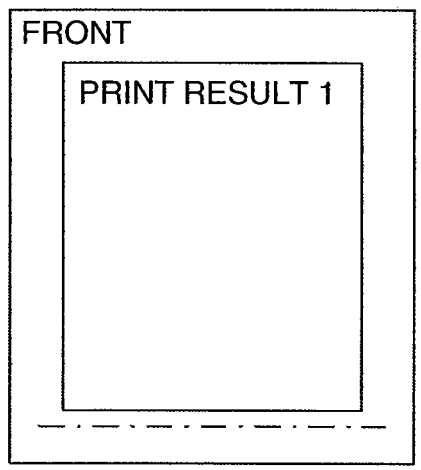
FIG. 5 schematically describes an example of the result of duplex printing when the specified text string is set in the printing device shown in FIG. 1.
Figure 5B:
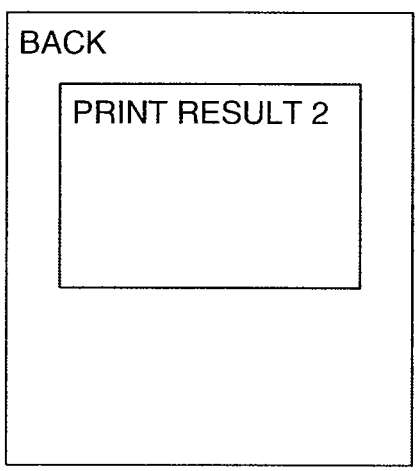

FIG. 5 shows an example of the printout from this process. In this example print result 1 and print result 2 are printed and the paper is cut. FIG. 5(a) shows the front side and (b) shows the back side. Because this process prints on both sides, the length of the printout 30a cut from the roll paper 30 is the length of the printout 1 having the most lines printed. The double-side printout 30a acquired by this process is shorter than the single-sided printout 30a.

As described above, the printer 10 according to this embodiment of the invention sets the specified text string according to the specified text string setting command CA, writes the print data to the first data storage area 105a of the print data storage unit 105 until data matching the specified text string is found in the print data sent from the host computer 20, and when data matching the specified text string is found in the print data writes the print data following the specified text string to the second data storage area 105b of the print data storage unit 105. If a paper cutting command is received after the print data is stored in the first data storage area 105a and the second data storage area 105b, the print data stored in the first data storage area 105a and second data storage area 105b is printed simultaneously to the opposite sides of the roll paper 30. As a result, the printer 10 can switch on demand between duplex printing and simplex printing according to the content of the print data without setting the printing method before executing the printing process. In addition, compared with printing the second side of the roll paper 30 after printing to the first side of the roll paper 30, printing can be completed more quickly and consumption of roll paper 30 can be reduced.

Furthermore, if it cannot be determined that data matching the specified text string is contained in the received data before the cutting command CC used as the start printing command is received, operation continues in the single-sided print mode based on the first-side data stored in the first data storage area 105a in step S27. As a result, operation can continue in the simplex printing mode without selecting single-sided printing.

This embodiment of the invention sets one specified text string, but a plurality of different specified text strings may be made available and the desired string may be selected from among them. This provides greater freedom setting the specified text string, and enables setting a particular specified text string as needed by the user. In addition, by enabling deleting the plural specified text strings individually or in batches, it is possible to change only a portion of the specified text strings when the use and application of the printer changes, and to delete a batch of strings when the set specified text strings become unnecessary.

Second Embodiment

Figure 6:
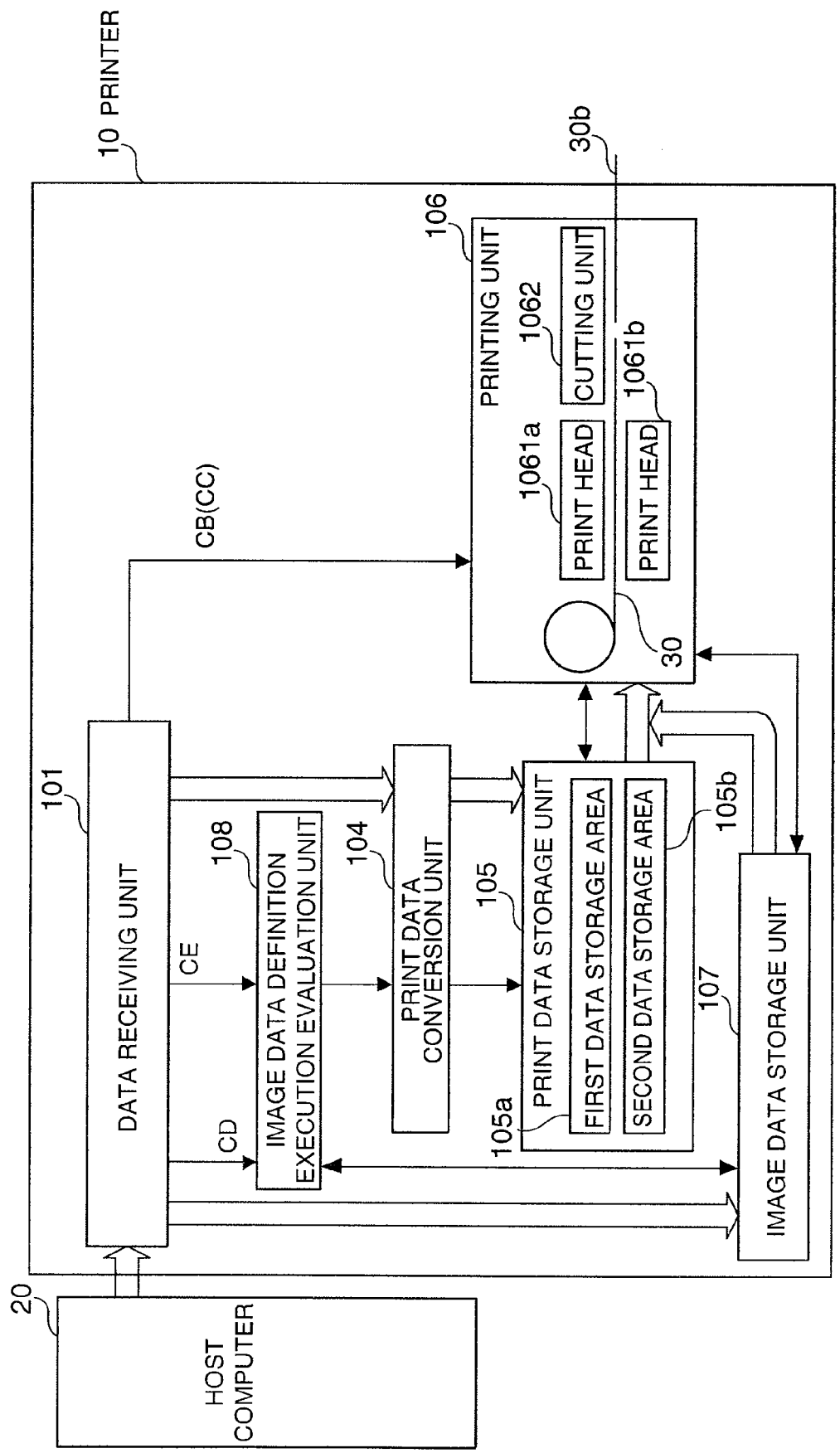
FIG. 6 is a schematic block diagram of a printing device according to a second embodiment of the invention.

FIG. 6 is a schematic block diagram of a printing device according to a second embodiment of the invention. As shown in FIG. 6, a printer 10 according to this embodiment of the invention is a line thermal printer that prints on one side or both sides of a printing medium (such as roll paper or other type of continuous media) according to print commands from a host computer 20.

The printer 10 according to this embodiment of the invention has a data reception unit 101, an image data definition execution evaluation unit 108, a print data conversion unit 104, a print data storage unit 105, and a printing unit 106.

The data reception unit 101 receives and passes print data sent from the host computer 20 to the print data conversion unit 104. The data reception unit 101 also interprets the received print data, and if an image data print command CE is detected, inputs the detected command CE to the image data definition execution evaluation unit 108.

If a start printing command CB is also detected as a result of interpreting the print data, the command CB is also input to the printing unit 106.

When an image data definition command CD for defining image data is input from the data reception unit 101 to an image data storage unit 107, the image data definition execution evaluation unit 108 determines if the image data definition command CD can be executed or not. The image data definition command CD is a command for linking and storing a key code, the size of the image data, the color, and the actual definition data in the image data storage unit 107. More specifically, the image data definition command CD is a command for storing a logo or other image data separately from characters or other text data. However, if an illegal value (data outside the definable range) is input as the key code, data size, color, or definition data, or image data exceeding the storage capacity of the image data storage unit 107 is specified, the image data is not defined in the image data storage unit 107.

When an image data print command CE is input from the data reception unit 101, the image data definition execution evaluation unit 108 determines if the image data print command CE can be executed. The image data print command CE is a command for printing the image data defined in the image data storage unit 107. More specifically, when a defined key code and the aspect ratio (height to width ratio) for printing are defined by the image data definition command CD, the data size, color, and definition data that are defined linked to the key code are read from the image data storage unit 107, and the image data is printed at the specified aspect ratio. However, if an illegal value (a value outside the definable range) is input as the key code or the aspect ratio, or if the image data is not defined in the image data storage unit 107, the image data print command CE cannot be executed and the image data is not printed.

The print data conversion unit 104 continues writing the print data from the host computer 20 to the first data storage area 105a of the print data storage unit 105 until the image data definition execution evaluation unit 108 decides that the image data print command CE can be executed. When the image data definition execution evaluation unit 108 decides that the image data print command CE can be executed, the print data from the host computer 20 is written to the second data storage area 105b of the print data storage unit 105. More specifically, until it is determined that the image data print command CE can be executed, the print data conversion unit 104 writes the print data from the host computer 20 to the first data storage area 105a, and after it is determined that the image data print command CE can be executed, the following print data is written to the second data storage area 105b.

As described above, the print data storage unit 105 has a first data storage area 105a and a second data storage area 105b. This embodiment of the invention writes the first-side data, which is the data to be printed on the front of the roll paper 30, contained in the received print data to the first data storage area 105a, and writes the data to be printed on the second side contained in the received print data to the second data storage area 105b. RAM or other type of volatile memory is used as the print data storage unit 105 in this embodiment of the invention.

The image data storage unit 107 stores image data for printing a logo, for example, on the roll paper 30. The image data storage unit 107 may be nonvolatile memory such as EPROM or EEPROM, or volatile memory such as RAM. If nonvolatile memory is used, the image data defined by the image data definition command CD remains in memory even after the printer 10 power turns off, and it is therefore not necessary to redefine the image data. Different image data can also be redefined for the same key code. The previous data is erased if the data is successfully defined in this case, but the previous image data remains in memory if the data is not successfully defined. If volatile memory is used, however, the image data defined by the image data definition command CD is cleared when the printer 10 power turns off, but new image data can be defined by the image data definition command CD.

The printing unit 106 includes two print heads 1061a and 1061b disposed in opposition with the roll paper 30 therebetween, and a cutting unit 1062 for cutting the roll paper 30. Of these two print heads 1061a and 1061b, the printing unit 106 uses one print head 1061a to print on the first side of the roll paper 30 based on the data stored in the first data storage area 105a, and uses the other print head 1061b to print on the second side of the roll paper 30 based on the data stored in the second data storage area 105b.

The print heads 1061a and 1061b are line thermal print heads, and the roll paper 30 is fed the distance equal to one line each time the print head prints one line. The operations of printing one line and advancing the paper one line are repeated to continuously print both sides of the roll paper 30 simultaneously.

When simplex printing is selected, either one of the print heads 1061a and 1061b is driven to print on one side of the paper.

Note that thermal paper is used as the roll paper 30 in this embodiment of the invention. The roll paper 30 is a paper web that is wound into a cylindrical roll, and is used loaded into the printing unit 106.

The printing unit 106 in this embodiment of the invention simultaneously executes the duplex printing mode including printing image data stored in the image data storage unit 107 to either the first side or second side of the roll paper 30 according to the start printing command CB from the host computer 20.

However, if the image data definition execution evaluation unit 108 decides that the image data definition command CD cannot be executed or if an image data print command CE is not detected, the printing unit 106 operates a simplex printing mode not including the image data.

In this embodiment of the invention the start printing command CB is a cutting command CC for cutting the roll paper 30. If the image data definition execution evaluation unit 108 determines that the image data print command CE can be executed and the cutting command CC is then received, the printing unit 106 simultaneously prints the first-side data in the first data storage area 105a and the second-side data in the second data storage area 105b on in the duplex printing mode including the image data.

If the image data definition execution evaluation unit 108 determines that the image data print command CE cannot be executed before the cutting command CC that functions as the start printing command is received, the printing unit 106 prints on one side of the paper not including image data based on the first-side data stored in the first data storage area 105a.

After simplex printing or duplex printing, the printing unit 106 then controls the cutting unit 1062 to cut the roll paper 30.

Figure 7:
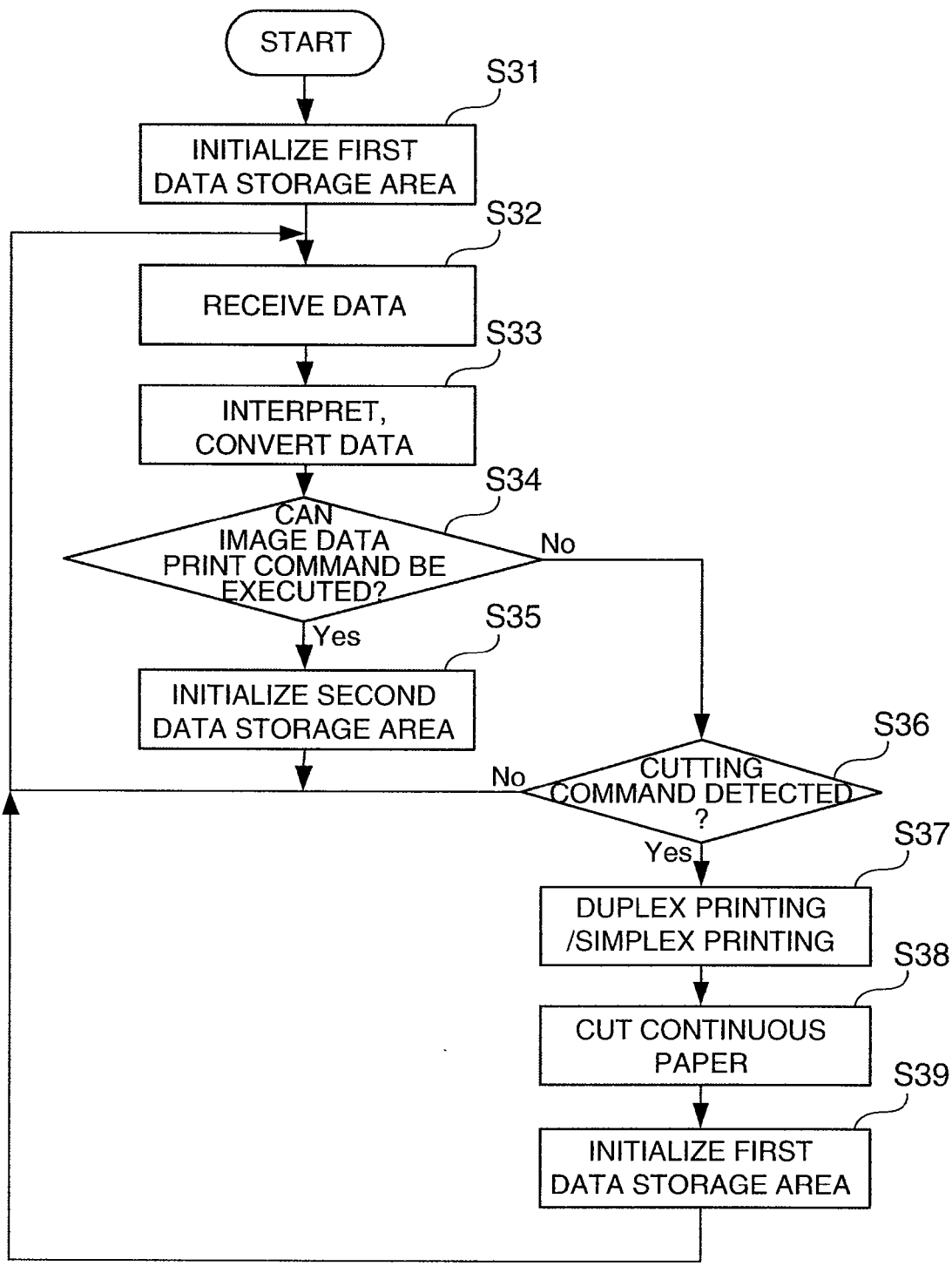
FIG. 7 is a flow chart of the printing process of the printing device shown in FIG. 6.

The operation of the printer 10 according to this embodiment of the invention is described next. FIG. 7 is a flow chart describing the printing process of the printer according to this embodiment of the invention.

Operation starts by initializing the first data storage area 105a of the print data storage unit 105 (step S31), then receiving print data sent from the host computer 20 (step S32), and interpreting and writing the data to the first data storage area 105a of the print data storage unit 105 (step S33).

The print data conversion unit 104 repeats steps S32 and S33 and writes the print data to the first data storage area 105a until the data reception unit 101 receives the image data print command CE (step S34 returns No and step S36 returns No). When the data reception unit 101 receives the image data print command CE, the print data conversion unit 104 determines if the image data print command CE can be executed (step S34). As described above, the print data conversion unit 104 determines if an illegal value (data outside the definable range) is input as the key code or aspect ratio, or if the image data is not defined in the image data storage unit 107.

If a legal value is input as the key code or aspect ratio, and image data is defined in the image data storage unit 107, it is determined that the image data print command CE can be executed (step S34 returns Yes), the second data storage area 105b of the print data storage unit 105 is initialized (step S35), and control returns to step S32 to continue data reception.

If it is determined that the image data print command CE can be executed, the print data following the image data print command CE is written to the second data storage area 105b. More specifically, the received data is written to the first data storage area 105a until the image data print command CE is received, and after it is determined that the image data print command CE can be executed, the print data following the image data print command CE is written to the second data storage area 105b. Writing the print data to the second data storage area 105b continues until the cutting command CC functioning as the start printing command is received.

When the cutting command CC is received, data including image data is printed simultaneously to the front and back sides of the roll paper 30 (step S37). More specifically, the first-side data stored in the first data storage area 105a of the print data storage unit 105 and image data read from the image data storage unit 107 are printed to the front of the roll paper 30, and the second-side data stored in the second data storage area 105b of the print data storage unit 105 is printed on the back side of the roll paper 30. After printing both sides, the roll paper 30 is cut (step S38). After cutting the roll paper 30, the first data storage area 105a of the print data storage unit 105 is initialized (step S39). Control then returns to step S12, and processing print data sent from the host computer 20 continues as described above.

Figure 8A:
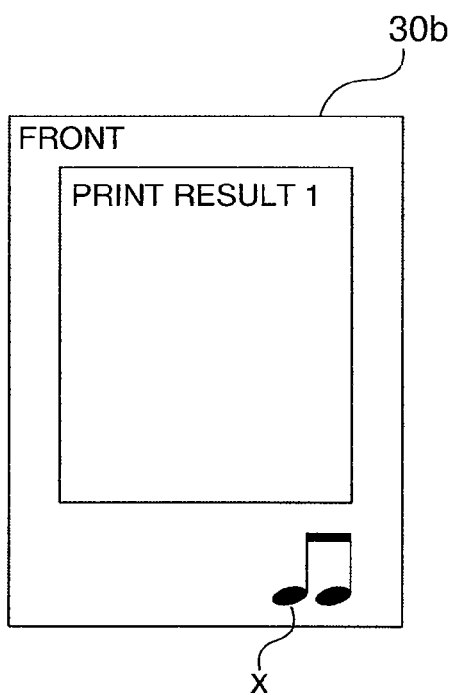
FIG. 8 schematically describes an example of the result of duplex printing in the printing device shown in FIG. 6.
Figure 8B:
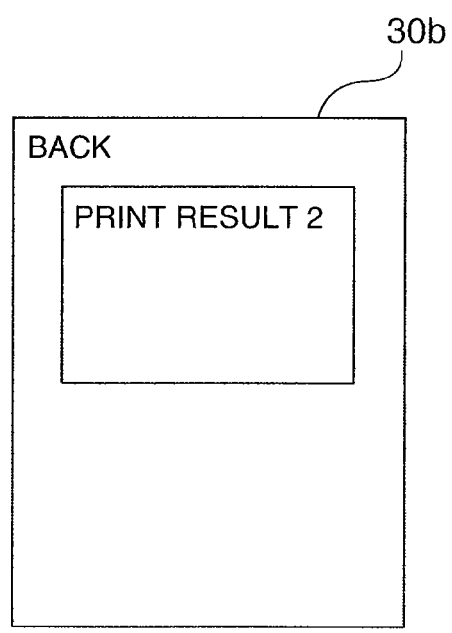

FIG. 8 shows an example of the printout from this process. FIG. 8(a) shows the front side and (b) shows the back side. In this example print result 1 (the print data stored in the first data storage area) and logo X are printed on the front of the roll paper 30, print result 2 (the print data stored in the second data storage area) is printed on the back side of the roll paper 30, and the paper is cut. Because this process prints on both sides, the length of the printout 30b cut from the roll paper 30 is the length of print result 1 plus the length of the logo X.

Figure 9A:
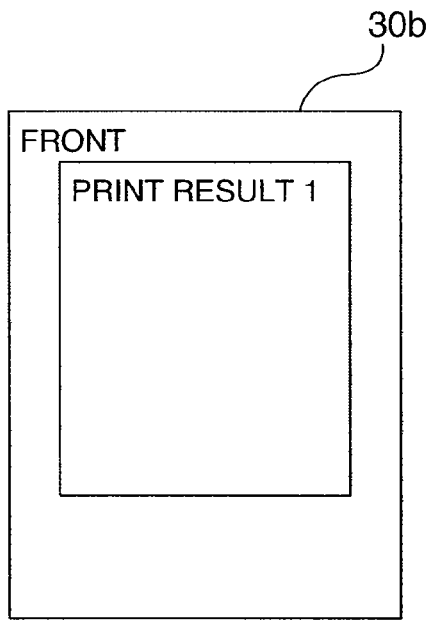
FIG. 9 schematically describes another example of the result of duplex printing in the printing device shown in FIG. 6.
Figure 9B:
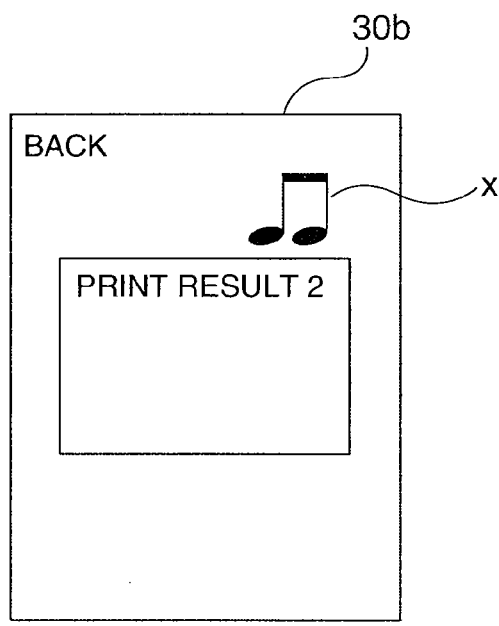

As shown in FIG. 9, the logo X may alternatively be printed at the beginning of the second side. In this case operation returns to step S17, the first-side data written to the first data storage area 105a of the print data storage unit 105 is printed on the front side of the roll paper 30, and the image data read from the image data storage unit 107 and the second-side data written to the second data storage area 105b of the print data storage unit 105 are simultaneously printed on the back side of the roll paper 30. Whether logo X is printed at the end of the first side or the beginning of the second side is determined from a parameter of the image data print command CE, and image data in the image data storage unit 107 is written to the first data storage area 105a or second data storage area 105b.

Figure 10A:
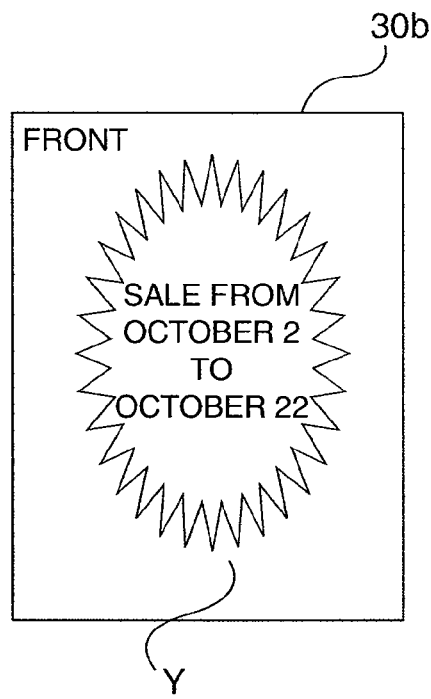
FIG. 10 schematically describes another example of the result of duplex printing in the printing device shown in FIG. 6.
Figure 10B:
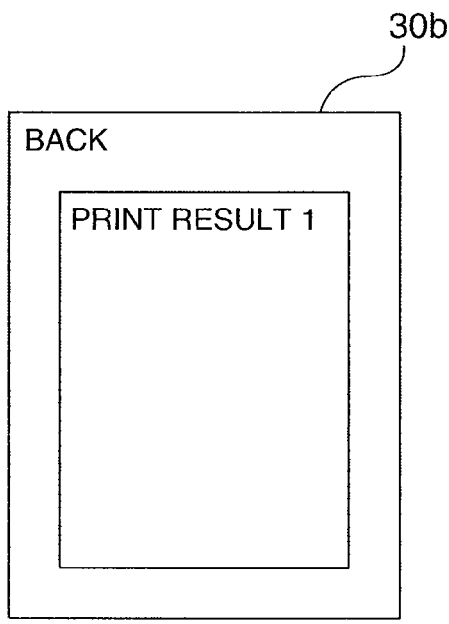

As shown in FIG. 10, a logo Y can be printed on the front of the roll paper 30 and the print data printed on the back side. In this case, when data is received from the host computer 20 in step S32 and the received data is determined to be an image data print command CE in step S33, step S34 determines if the received image data print command CE can be executed. If it is determined that the image data print command CE can be executed, the second data storage area 105b is initialized. The print data received following the image data print command CE is then written to the second data storage area 105b. In step S37, therefore, the image data read from the image data storage unit 107 is printed to the front of the roll paper 30, and the print data written to the second data storage area 105b of the print data storage unit 105 is printed on the back side of the roll paper 30.

However, if an illegal value (a value outside the definable range) is input as the key code or aspect ratio in the image data print command CE, or if image data is not defined in the image data storage unit 107, step S34 determines that the image data print command CE cannot be executed (step S34 returns No). If it is determined that the command CE cannot be executed and the cutting command CC is then received, operation continues in the simplex printing mode based on the print data written to the first data storage area 105a before the cutting command CC was received (step S37).

If the cutting command CC is received without receiving the image data print command CE, operation continues in the simplex printing mode based on the print data written to the first data storage area 105a (step S37).

Figure 11:
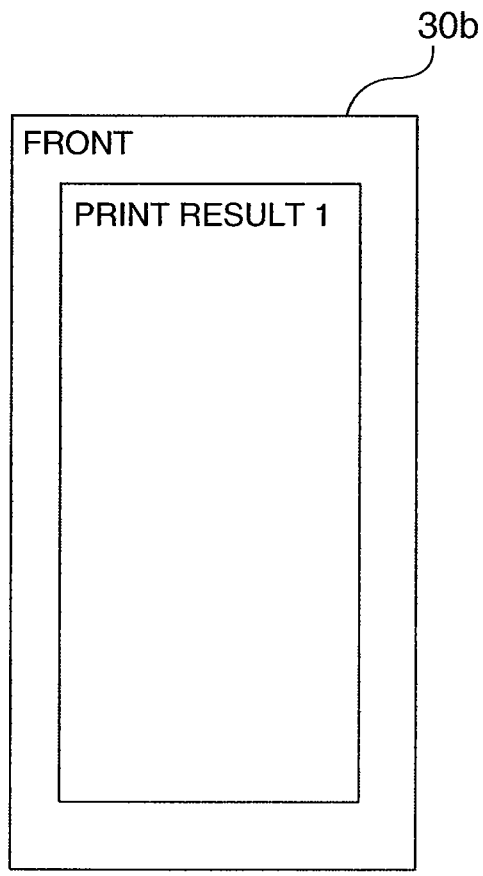
FIG. 11 schematically describes an example of the result of simplex printing in the printing device shown in FIG. 6.

FIG. 11 shows an example of the result of the simplex printing mode in this process. In this example only print result 1 (the print data written to the first data storage area) is printed on the front of the roll paper 30, which is then cut. This process executes in the simplex printing mode, a logo is not printed, and the length of the resulting printout 30b is the same as the result of the simplex printing process according to the related art.

The printer 10 according to this embodiment of the invention thus writes print data sent from the host computer 20 to the first data storage area 105a of the print data storage unit 105 until an image data print command CE, which is a command sent from the host computer 20 for printing image data stored in the image data storage unit 107, is determined to be executable. When the image data print command CE is determined to be executable, the print data is written to the second data storage area 105b of the print data storage unit 105. When a cutting command CC that is used as the start printing command is received, the first-side data written to the first data storage area 105a and the second-side data written to the second data storage area 105b are printed simultaneously in the duplex printing mode including a logo printed to one of the sides.

However, if a cutting command CC is received before it is determined that the image data print command CE can be executed, operation proceeds in the simplex printing mode based on the first-side data stored in the first data storage area 105a. As a result, the printer 10 can switch the printing process on demand based on whether the image data print command CE can be executed without setting the printing method before executing the printing process. If an image data print command CE is not contained in the print data, the simplex printing process executes. If a image data print command CE is contained in the print data, operation can switch between duplex printing and simplex printing based on whether or not the image data print command CE can be executed.

Furthermore, image data for a logo can be inserted in duplex printing, and a more visually appealing printout can be achieved. More particularly, because both sides of the printout are printed simultaneously in the duplex printing mode, printing can be completed in less time than when the second side of the printout is printed after the first side is printed.

In addition, because the cutting command CC triggers both printing and cutting, it is not necessary to use both a start printing command and a cut paper command, and fewer commands need to be input and processed.

Note that by making image data for a plurality of different images available and enabling selecting the desired image (at least one image) from among those available, greater freedom printing image data can be achieved. In this case a key code is assigned to each image, and the desired image can be printed at the intended location on the paper by selecting and executing the corresponding key code.

When a plurality of images are printed in a single transaction (processing transmission of a single data train until a paper cutting command executes), printing always switches from the first side to the second side at the position of the first image. Even if a second or subsequent image data print command is received in this case, printing continues on the second side and the second and subsequent images are printed on the second side.

Third Embodiment

Figure 12:
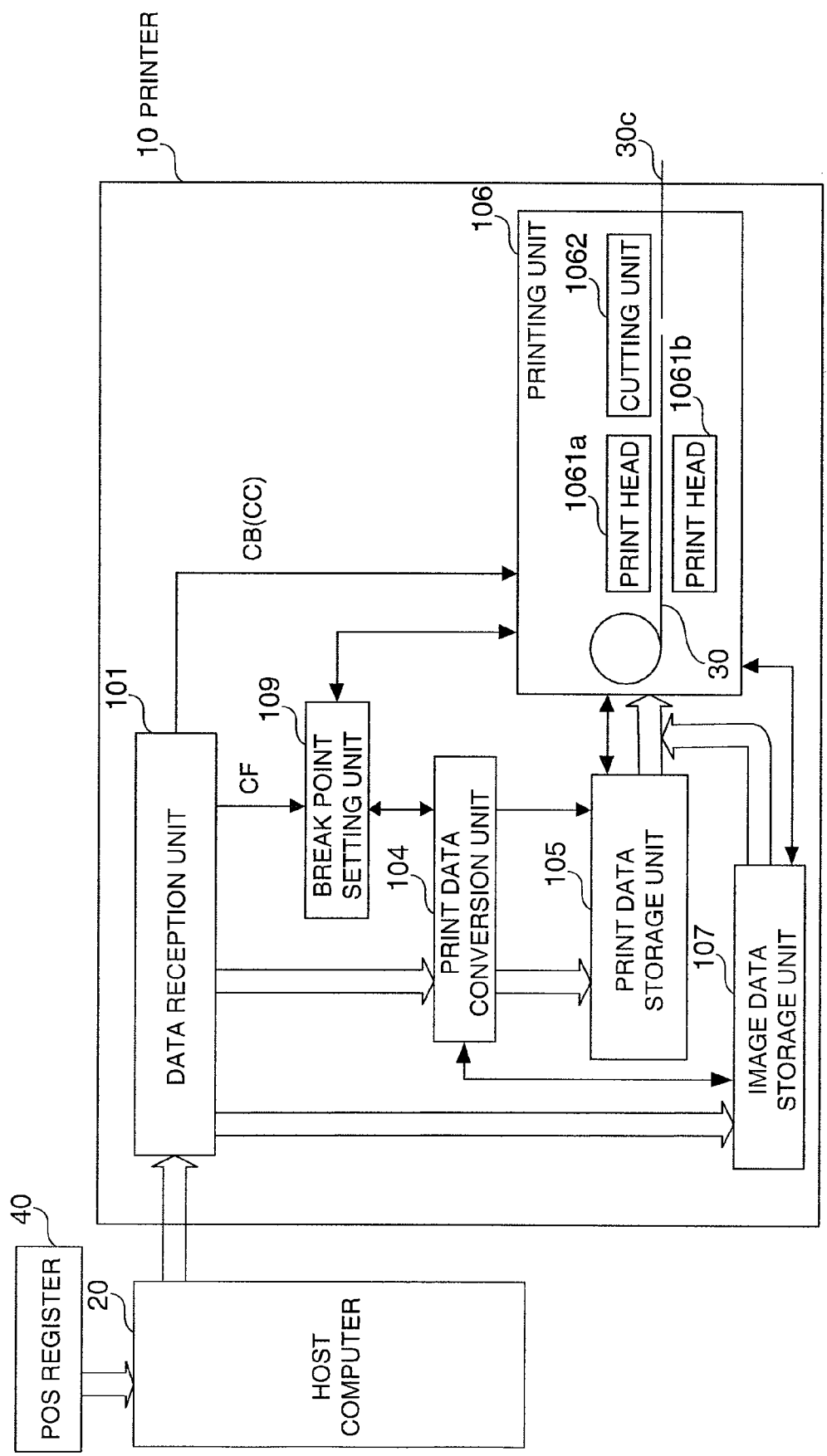
FIG. 12 is a schematic block diagram of a printing device according to a third embodiment of the invention.

FIG. 12 is a schematic block diagram of a printing device according to a third embodiment of the invention. As shown in FIG. 12 the host computer 20 is connected to a POS register 40 (checkout terminal) having a transaction function for processing product purchases in a business such as a convenience store or supermarket. The POS register 40 sends the captured data to the host computer 20, and issues a receipt printing command when the tabulation process is completed. The host computer 20 generates a receipt print job according to the receipt printing command, and sends the result as the print data to the printer 10.

The printer 10 prints on one side or both sides of the print medium (wound continuous paper such as roll paper in this embodiment of the invention) according to the print data sent from the host computer 20. In this embodiment of the invention the host computer 20 is a line thermal printer for printing receipts.

The printer 10 according to this embodiment of the invention has a data reception unit 101, a break point setting unit 109, a print data conversion unit 104, a print data storage unit 105, an image data storage unit 107, and a printing unit 106.

The data reception unit 101 receives and passes print data sent from the host computer 20 to the print data conversion unit 104. The data reception unit 101 also interprets the received print data, and if a start printing command CB is detected, inputs the detected command CB to the printing unit 106. If a break point setting command CF is detected, the data reception unit 101 also inputs the command CF to the break point setting unit 109.

The break point setting unit 109 sets a break point in the converted print data according to the break point setting command CF, which sets the break point for separating the print data in the print data storage unit 105 into first-side data and second-side data. In this embodiment of the invention the break point is a number of dots in the lengthwise direction of the print data when the transportation direction of the roll paper 30 is lengthwise. The printer 10 has a command for setting the break between the data printed on the first side and the data printed on the second side using a dot count, and stores the command in the break point setting unit 109.

The print data conversion unit 104 measures the dot count of the converted print data while writing the text data in the received print data into the print data storage unit 105.

The print data storage unit 105 stores the text data contained in the print data sent from the host computer 20. In this embodiment of the invention the first-side data (front-side data) and second-side data (back-side data) are written continuously into a single data storage area in the print data storage unit 105. It is therefore not necessary to provide a separate data storage area for duplex printing. Volatile memory such as RAM is used for the print data storage unit 105.

The image data storage unit 107 stores image data for printing a logo, for example, on the roll paper 30. The image data storage unit 107 may be nonvolatile memory such as EPROM or EEPROM, or volatile memory such as RAM. If nonvolatile memory is used, the defined image data remains in memory even after the printer 10 power turns off, and it is therefore not necessary to redefine the image data. If volatile memory is used, however, the defined image data is cleared when the printer 10 power turns off, but new image data can be defined by the image data definition command.

When an image data definition command is input from the data reception unit 101, image data is defined in the image data storage unit 107. The image data definition command is a command for storing is a command for linking and storing a key code, the size of the image data, the color, and the actual definition data in the image data storage unit 107. More specifically, the image data definition command CD is a command for storing a logo or other image data separately from characters or other text data. However, if an illegal value (data outside the definable range) is input as the key code, data size, color, or definition data, or image data exceeding the storage capacity of the image data storage unit 107 is specified, the image data is not defined in the image data storage unit 107.

The printing unit 106 includes two print heads 1061a and 1061b disposed in opposition with the roll paper 30 therebetween, and a cutting unit 1062 for cutting the roll paper 30. The printing unit 106 executes a printing process to simultaneously print both sides of the roll paper 30 using one of these two print heads 1061a and 1061b, that is, print head 1061a, to print based on the data stored in the first data storage area 105a.

The print heads 1061a and 1061b are line thermal print heads, and the roll paper 30 is fed the distance equal to one line each time the print head prints one line. The operations of printing one line and advancing the paper one line are repeated to continuously print both sides of the roll paper 30 simultaneously.

Note that thermal paper is used as the roll paper 30 in this embodiment of the invention. The roll paper 30 is a paper web that is wound into a cylindrical roll, and is used loaded into the printing unit 106.

In this embodiment of the invention the printing unit 106 determines if the break point set by the break point setting command CF is a value that can be used to divide the converted print data. More specifically, if the break point setting command CF sets a break point enabling dividing the print data, the printing unit 106 separates the data stored in the print data storage unit 105 into first-side data and second-side data based on the set break point, and then prints in the duplex printing mode based on the start printing command CB. If the maximum longitudinal dot count of the converted print data is set as the break point by the break point setting command CF, the printing unit 106 determines that the print data cannot be split and prints in the simplex printing mode.

However, if a break point is not set by the break point setting command CF, a value that splits the print data in half is used as the break point for duplex printing.

In this embodiment of the invention the start printing command CB is a cutting command CC for cutting the roll paper 30.

After simplex printing or duplex printing, the printing unit 106 then controls the cutting unit 1062 to cut the roll paper 30 according to the cutting command CC.

Figure 13:
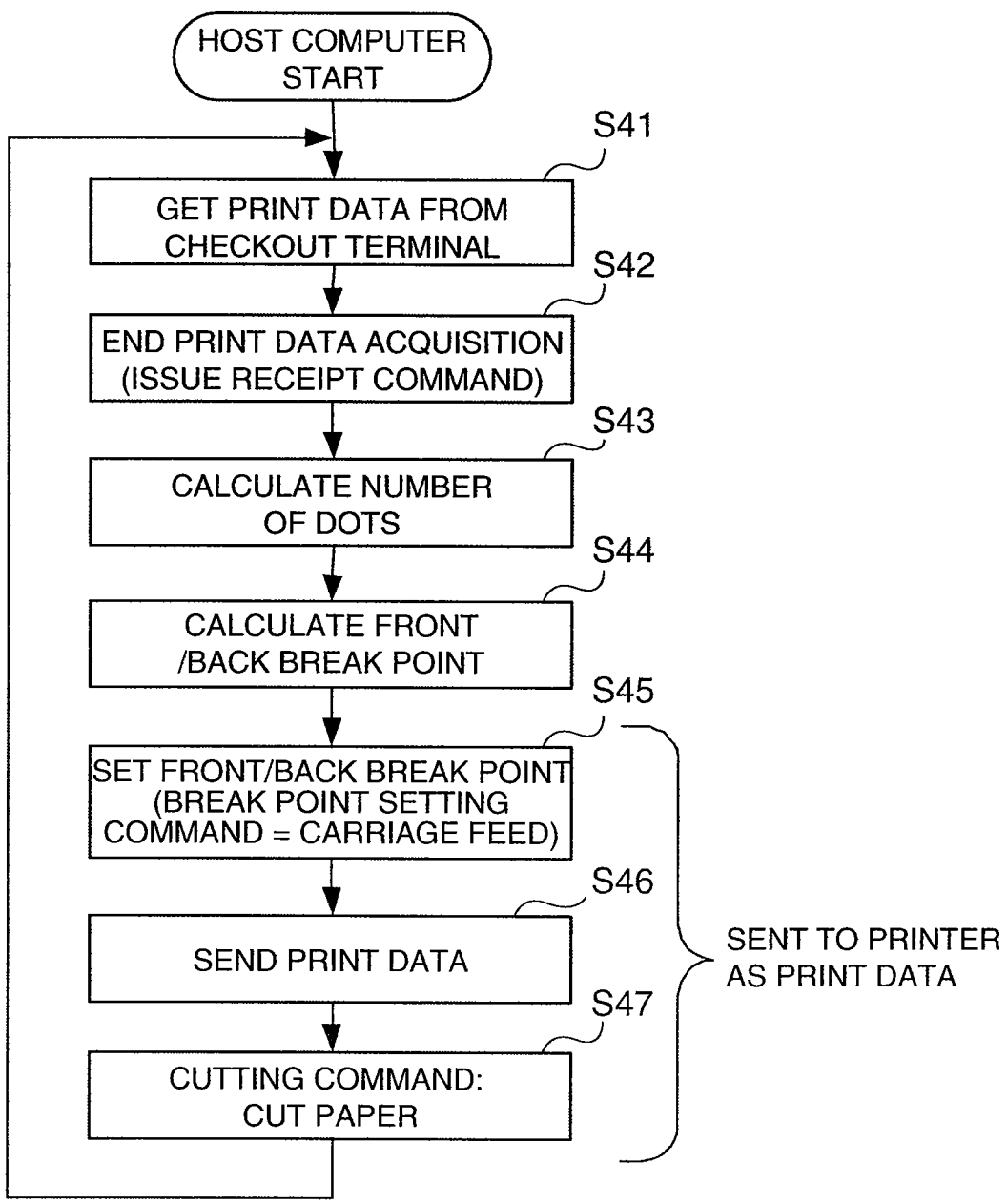
FIG. 13 is a flow chart of the receipt issuing process executed by the host computer in a third embodiment of the invention.

The operation of the host computer 20 and printer 10 are described next. FIG. 13 is a flow chart showing the receipt issuing process executed by the host computer in this embodiment of the invention.

Sequential receipt print data sent from the POS register 40 is acquired (step S41) and an issue receipt command is acquired (step S42). The host computer 20 stores the print data in the host computer buffer (not shown in the figure) and generates a print image. The host computer 20 then calculates the vertical dot count of the print image (step S43), and calculates the position for dividing the print image into first-side data and second-side data (step S44).

Figure 14:
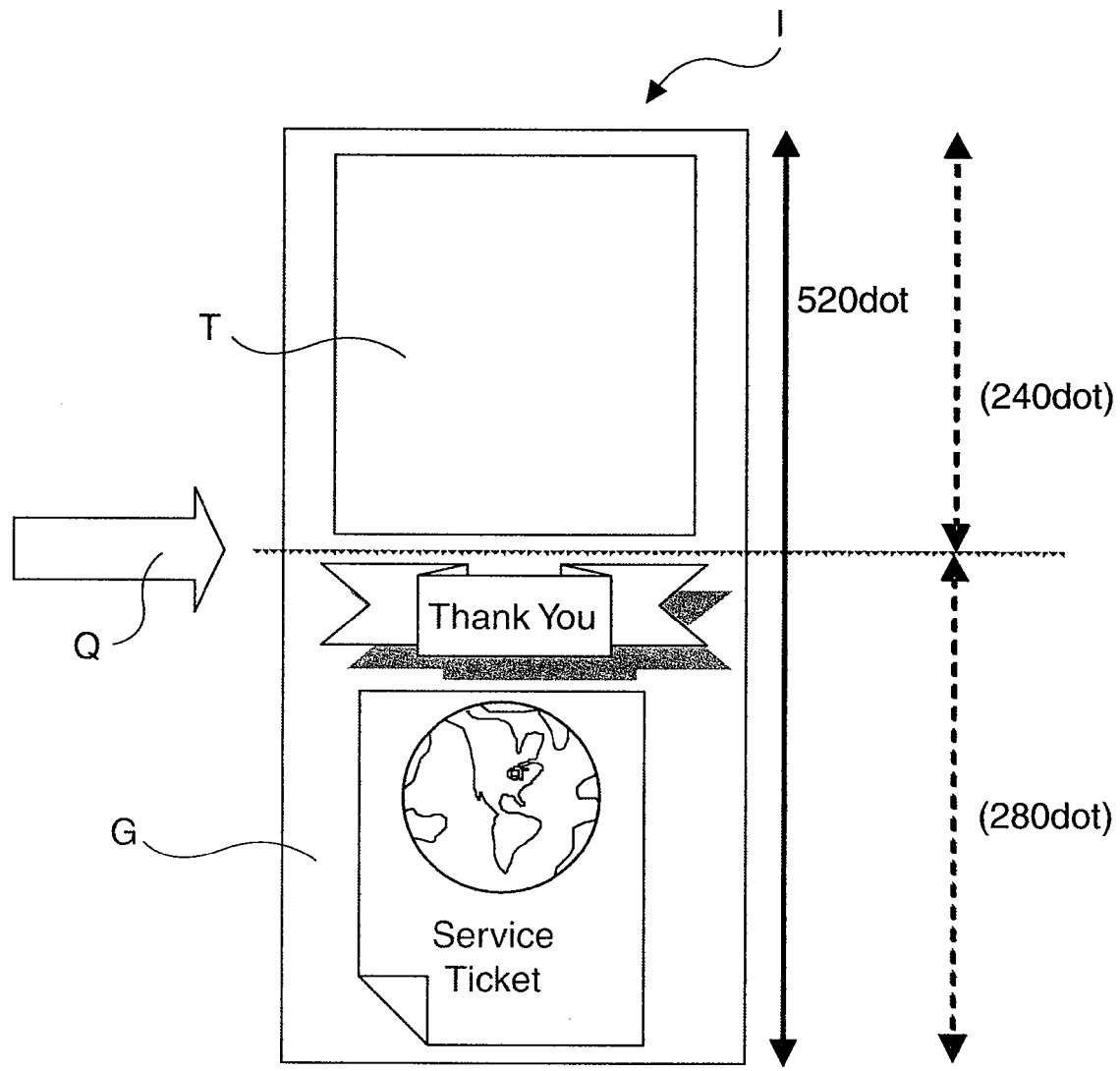
FIG. 14 shows an example of the print image written to the buffer of the host computer in the third embodiment of the invention.

When the print image I includes text data T and image data G as shown in FIG. 14, for example, the position for dividing the print image into first-side data and second-side data can be calculated by finding a space of at least a certain size between the text data T and the image data G, and then counting the number of dots from the leading longitudinal end of the print image I to this space. This dot length is used as the break point. In the example shown in FIG. 14 the maximum longitudinal dot count of the print image I is 520 dots, and the 240 dot distance from the leading longitudinal end of the print image I to this space is calculated as the break point.

Once the switching position is calculated, a break point setting command CF that sets this position for switching between the front and back sides as the break point is generated (step S45), and the print data is sent to the printer 10 after the break point is set by this command (step S46). After sending the print data, a cutting command CC is generated as the start printing command and sent to the printer 10 (step S47). In this embodiment of the invention the specified text string setting command CA produced in step S45, the print data sent in step S46, and the cutting command CC produced and output in step S47 are together referred to as the print data.

When the print image I includes the text data T and image data G as described above, the specified text string setting command CA, text data, cutting command CC, and an image data print command are also included.

In this embodiment of the invention, therefore, the host computer 20 also has a function enabling it to read and buffer the print image to be printed by the printer 10 in order to calculate the break point between the content to be printed on the front of the receipt and the content to be printed on the back.

Figure 15:
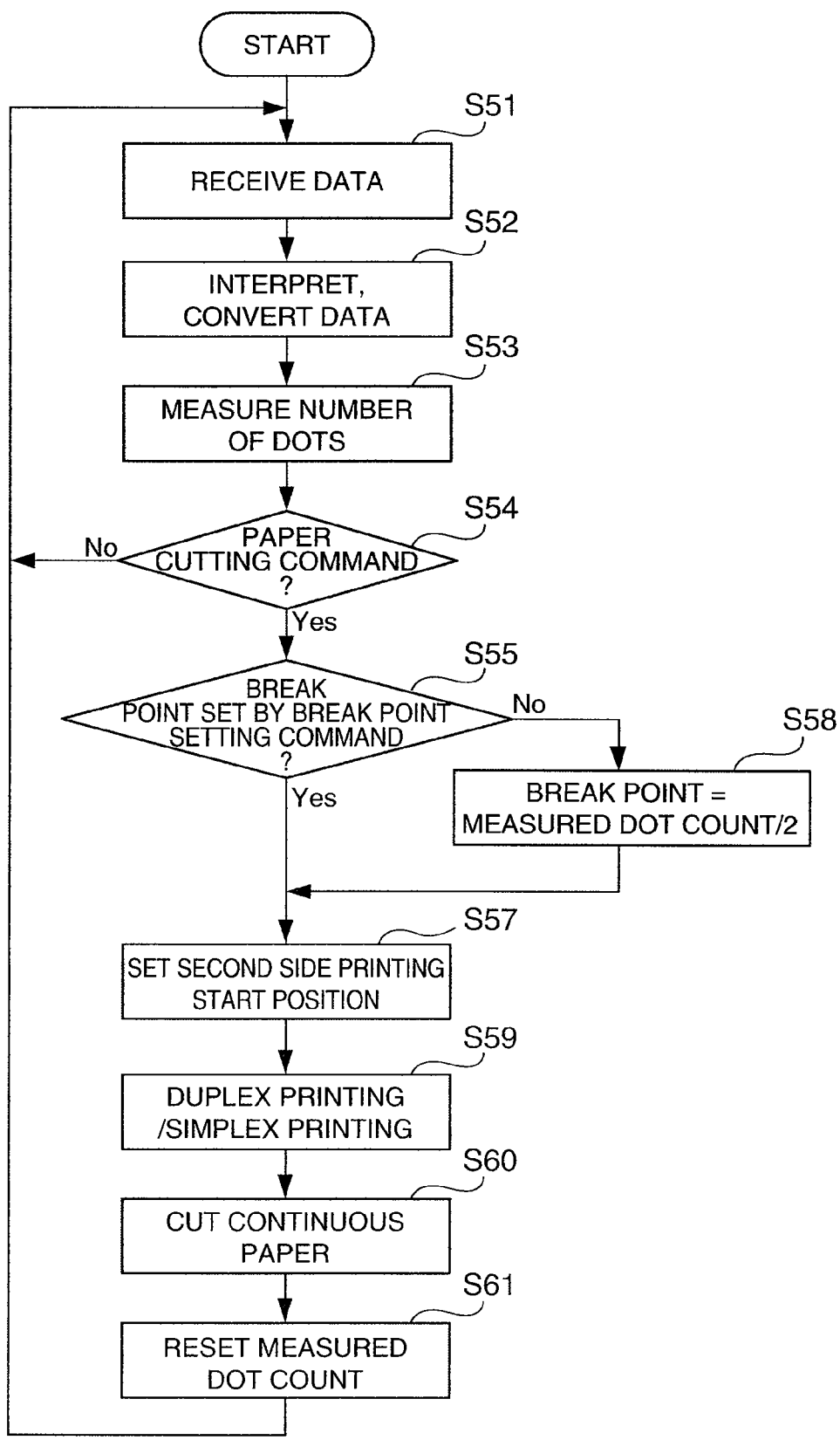
FIG. 15 is a flow chart describing the printing process executed by the printing device shown in FIG. 12.

FIG. 15 is a flow chart of the printing process executed by the printer according to this embodiment of the invention.

The print data sent from the host computer 20 is received (step S51), the data is interpreted, and if a break point setting command CF is found the break point setting unit 109 sets the specified break point. The front/back switching position calculated by the host computer 20 is set as the break point at this time. More specifically, if the maximum longitudinal dot count of the print image I is 520 dots as shown in FIG. 14, the 240 dot distance from the leading lengthwise end of the print image I to the space is set as the break point (indicated by arrow Q).

The data reception unit 101 continues receiving and interpreting the data until the cutting command CC used as the start printing command is received. If text data is found as a result of interpreting the received data, the text data is written to the print data storage unit 105 (step S52). At this time the print data conversion unit 104 calculates the dot length of the converted data written to the print data storage unit 105 (step S53). Measuring the dot length of the image data written to the image data storage unit 107 is also included.

When the cutting command CC is received (step S54 returns Yes), it is determined if a break point is set by the break point setting command CF (step S55). If the break point is set (step S55 returns Yes), the break point is set as the position for starting to print the back side (step S57).

If the break point is not set (step S55 returns No), half the measured dot length (break point=measured dot length/2) is set as the break point, and the calculated break point is set as the position for starting to print the back side (step S58).

The printing unit 106 divides the print data written to the print data storage unit 105 into first-side data and second-side data based on the longitudinal dot count set as the position for starting to print the second side (arrow Q), and then prints the front and back sides simultaneously (step S59). For example, when the print image is as shown in FIG. 14, the print head 1061*a* prints on the front side of the paper based on the print data to the point 240 dots from the leading lengthwise end of the print data, and the print head 1061*b* prints on the back side of the paper based on the print data from dot 240 to dot 520, the maximum longitudinal dot length of the print image.

The print image I to be printed in this embodiment of the invention includes text data T and image data G, but because the image data G is defined in the image data storage unit 107, the image data must be read from the image data storage unit 107 for printing.

Only the text data is stored in the print data storage unit 105. That is, the print head 1061*a* prints the front side based on the converted text data to the line at dot 240 from the leading longitudinal end, but the print head 1061*b* prints the back based on the image data read from the image data storage unit 107. However, because the print data conversion unit 104 measures the length considering the longitudinal length of the text data in dots and the length of the image data in dots, the data may be split into front and back sides in the middle of the image data depending on where the break point is set.

After duplex printing, the roll paper 30 is cut (step S60) and the dot count measured in step S53 is reset (step S61). Control then returns to step S51, and the same process described above is repeated using the print data sent thereafter from the host computer 20.

Figure 16A:
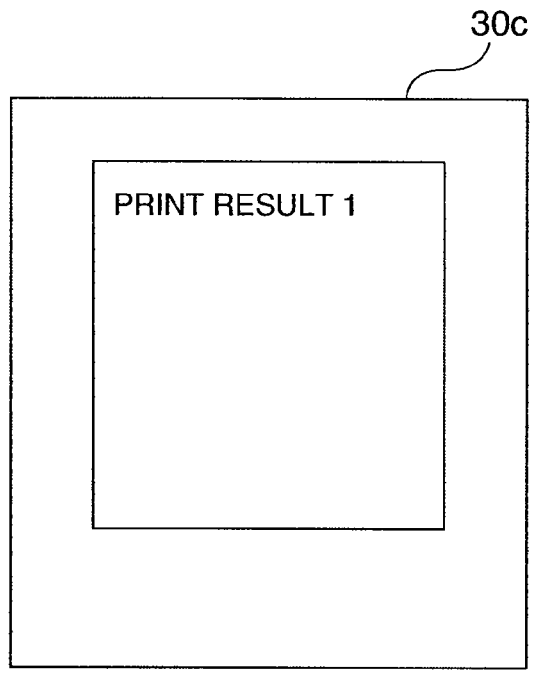
FIG. 16 schematically describes an example of the result of duplex printing by the printing device shown in FIG. 12.
Figure 16B:
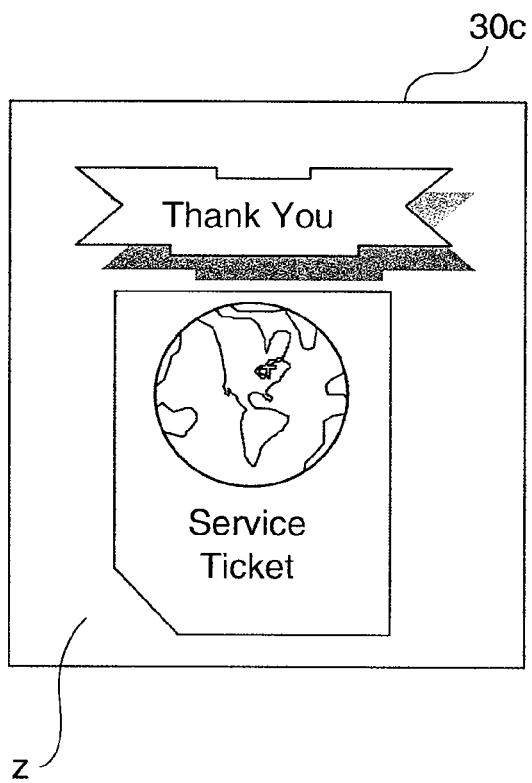

FIG. 16 shows an example of the printout from this process. FIG. 16(*a*) shows the front and (*b*) shows the back. In this example the text data T in the print image I shown in FIG. 14 is printed as print result 1 (the text data converted and written to the print data storage unit 105) on the front of the roll paper 30. The image data G in the print image I shown in FIG. 14 is printed as logo Z on the back of the roll paper 30. Because this embodiment of the invention operates in a duplex printing mode, the length of the printout 30*c* cut from the roll paper 30 is the length of the data with the greater longitudinal dot count when the print data is divided at the break point. That is, because the break point of 240 dots is less than (maximum longitudinal dot count−break point) (520 dots−240 dots=280 dots) in this embodiment of the invention, the length of the printout 30*c* is the length of the logo Z or 280 dots.

The break point can be set to the maximum longitudinal dot count (520 dots in this example). In this case the printing unit 106 determines that the set break point is a value that cannot divide the print data in step S55, drives only the print head 1061*a*, and operates in the simplex printing mode printing the front of the roll paper 30 based on the data from the leading longitudinal end to the maximum longitudinal dot count of 520 dots (step S59).

The printer 10 according to this embodiment of the invention can thus set the break point of the converted print image data for each print job according to the break point setting command CF, which sets the break point for dividing the print data from the host computer 20 stored in the print data storage unit 105 into first-side data and second-side data. If the break point is set, the print head 1061*a* prints the front side based on the print image data from the leading longitudinal end of the print image to the break point, and the print head 1061*b* prints the back side based on the print image data from the break point to the maximum longitudinal dot count. Because the break point can be set freely according to the print data sent from the host computer, the allocation of data to the front and back sides of the roll paper 30 can be changed freely according to where the break point is set even when the longitudinal length of the print data varies, and attractive double-sided printout can be produced.

In addition, because single-sided printing occurs if the break point is set to the maximum longitudinal dot count of the print data, operation can switch between duplex printing and simplex printing by simply setting the break point without previously selecting the printing method.

If the break point is not set, the maximum longitudinal dot count of the print image, or 520 dots in this example, divided by 2, or 260 dots in this example, is set as the break point, and the print data can be split evenly between the front and back sides of the roll paper 30. Because duplex printing is also selected, the length of the printout 30*c* can be shortened as much as possible by setting the break point at half the maximum longitudinal dot count of the print data. Paper consumption can therefore be reduced and the roll paper 30 can be replaced less frequently.

Furthermore, because the break point between text data and image data can be set when details of the purchased products are printed on the front and a logo or coupon is printed on the back, printing the back side will not start in the middle of the image data. A double-sided receipt that has a favorable visual impact on the customer can thus be issued.

In addition, because the cutting command CC triggers both printing and cutting, it is not necessary to use both a start printing command and a cut paper command, and fewer commands need to be input and processed.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. An electronic method for printing, the method comprising:

determining that an indicator has been preset for switching from a simplex printing mode in which only simplex printing is permitted to a duplex printing mode in which simplex and duplex printing is permitted, wherein detection of the indicator in received print data causes duplex printing to occur while in the duplex printing mode and wherein absence of the indicator in received print data causes simplex printing to occur while in the duplex mode;

initializing the duplex printing mode instead of the simplex printing mode based on determining that the indicator has been preset;

receiving print data from a host computer, the print data including the indicator, wherein the print data does not include supplemental duplex or simplex printing settings;

writing a first portion of the print data to a first memory unit until the indicator is detected within the print data;

writing a second portion of the print data following the indicator to a second memory unit;

printing a first side of a paper according to the first portion of the print data; and printing a second side of the paper according to the second portion of the print data, wherein the indicator comprises at least one predetermined character that is printed on the paper.

2. The method of claim 1 additionally comprising cutting the paper after printing is completed.

3. The method of claim 1, wherein the indicator comprises a specified text string.

4. The method of claim 3, wherein the specified text string is a line feed command.

5. The method of claim 1, wherein the print data additionally includes image data.

6. The method of claim 5, additionally comprising determining that the image data can be printed on the paper, and printing at least one image according to the image data on the paper.

7. The method of claim 6, wherein a location of the at least one image is determined by a key code which is pre-assigned to the at least one image.

8. The method of claim 1, wherein the indicator comprises a break point.

9. The method of claim 8, wherein the break point is within a series of dots in a lengthwise direction of the print data.

10. The method of claim 9, wherein analyzing the indicator comprises counting the total number of dots.

11. The method of claim 1, additionally comprising receiving a paper cutting trigger which functions as a cutting command and a start printing command.

12. The method of claim 1, additionally comprising sending the first portion of the print data to a first printing head, and sending the second portion of the print data to a second printing head.

13. The method of claim 1, wherein the first memory unit is a first data storage area of a print data storage unit and the second memory unit is a second data storage area of the print data storage unit.

14. The method of claim 1, further comprising:

while remaining in the duplex printing mode, receiving new print data from a host computer, the new print data not including the indicator, wherein the new print data does not include supplemental duplex or simplex printing settings;

writing the new print data to a first memory unit until it is determined that the new print data does not include the indicator; and printing only on a first side of a paper according to the new print data.

15. A printer, comprising:
a setting unit for presetting an indicator for switching from simplex printing mode in which only simplex printing is permitted to duplex printing mode in which simplex and duplex printing is permitted;
a data receiving unit configured to receive print data including an indicator, wherein the print data does not include supplemental duplex or simplex printing settings;
an evaluation unit configured to determine whether the print data includes the indicator, wherein detection of the indicator causes duplex printing to occur while in the duplex printing mode and wherein absence of the indicator causes simplex printing to occur while in the duplex mode;
a print data conversion unit configured to analyze and configure the print data for simplex or duplex printing according to the indicator;
a print data storage unit configured to store a first and second portion of the print data, wherein the first portion of the print data to is written to a first memory unit of the print data storage unit until the indicator is detected within the print data, and wherein the second portion of the print data following the indicator is written to a second memory unit of the print data storage unit;
a printing unit including a first print head for printing the first portion of the print data, and a second print head for printing the second portion of the print data,
wherein the indicator comprises at least one predetermined character that is printed within the print data.

16. The printer of claim 15, wherein the first and second print heads are configured to print on opposite sides of a thermal print roll.

17. The printer of claim 15, additionally comprising a cutting unit.

18. The printer of claim 15, wherein the indicator comprises a specified text string.

19. The printer of claim 15, wherein the indicator comprises a break point.

20. The printer of claim 15, additionally comprising an image data evaluation unit configured to analyze image data contained within the print data.

21. The printer of claim 20, additionally comprising an image data storage unit for storing the image data and for storing a key code related to the image data.

22. The printer of claim 21, wherein the print data conversion unit analyzes the total number of dots and calculates a portion of the dots to determine a position of the break point.

* * * * *